3,240,651
Patented Mar. 15, 1966

3,240,651
BONDING OF NEOPRENE TO POLYAMIDE
FIBERS
Everett C. Atwell, Greensboro, N.C., assignor to Burlington Industries, Inc., Greensboro, N.C., a corporation of Delaware
No Drawing. Filed July 3, 1961, Ser. No. 121,367
10 Claims. (Cl. 156—333)

The present invention relates to certain improvements in the bonding of unvulcanized neoprene rubber to linear polyamide fibers.

The difficulties involved in obtaining good adhesion between neoprene (polychloroprene) and linear polyamide fibers (nylon) are well known in the art and numerous proposals have been made for obtaining an improved bond. However, there is still a real need for new methods and techniques which will provide optimum adhesion between these materials.

Accordingly, the principal object of the present invention is to provide a method of bonding vulcanizable neoprene rubber and nylon fibers whereby remarkably outstanding adhesion is obtained. A more specific object of the invention is the provision of a unique pretreatment for nylon fibers to facilitate increased adhesion to neoprene. Other objects of the invention will also be hereinafter apparent.

Broadly stated, the invention contemplates the use of a single primer which comprises a neoprene latex and a partially condensed resorcinol-formaldehyde reaction product or resole, notably the base-catalyzed resole described in my copending applications Serial No. 42,956, now Patent No. 3,030,230, or Serial No. 49,179, the subject matter of these applications being incorporated herein by reference.

It is essential to the success of the invention that the resole be base-catalyzed. In other words, an acid-catalyzed resole will not give the results obtained herein.

The primer used herein may be prepared in the manner described in my abovementioned applications Serial No. 42,956 and Serial No. 49,179 except for the substitution of neoprene latex for the butadiene-acrylonitrile latex used in said applications. The resole herein is identical to the resole of said pending applications and is prepared by partial reaction of resorcinol and formaldehyde using a basic catalyst in the manner indicated. This primer is desirably organic solvent-free although small amounts of organic solvent may be included. Zinc oxide or other chlorine acceptor (5–15% on the weight of latex solids) should also be included along with, if desired, softening, wetting and antifoaming agents, etc. Further details regarding the preparation of the neoprene latex/resole composition used herein are included below.

Any commercially available neoprene latex may be used in making up the resole/neoprene latex of the invention. A typically suitable latex is available under the trade name "Neoprene 571" or "Neoprene 750."

The primer of resole and neoprene latex may be applied to the nylon fibers in any convenient fashion, e.g., by dipping, padding or spraying. The amount of resole/neoprene primer applied to the fibers will vary depending, for example, upon the weight and construction of the nylon material. Typically, the amount of add-on solids to be applied will be at least 5% by weight of the fibers with 15% a practical upper limit although higher percentages, for example 30% or even more, may be used In any event, it will be realized that the specific amount of add-on solids necessary to give maximum mutual bonding will vary from one situation to another It is important, however, that the ratio of resole to neoprene latex solids, in parts of solids by weight, will come within the range of from about 1:12 to about 1:2.5, preferably 1 part resole solids per 3.5 to 10 parts neoprene latex solids, in order to give optimum adhesion.

After impregnation, all of the water and any other liquid present should be removed from the goods by drying. Various drying temperatures and drying rates may be used so long as the fibrous material is completely dry prior to the step of bonding to the vulcanizable neoprene rubber.

The dried nylon, prepared in the manner described above, is characterized by its non-tacky nature and can be rolled up and stored for long periods of time without losing its bonding affinity for neoprene. As will be appreciated, this represents an outstanding advantage since the dried fiborus material can be stored until the neoprene is to be applied thereto. A unique feature of the dried material is that, even after long storage, no reactivation of the treated fabric surface is necessary for effective bonding with neoprene. This is in contrast to known adhesive treated fabrics wherein reactivation, for example, by organic solvent treatment or water, is essential to effect bonding after storage.

The primed nylon fibers, in yarn or fabric form or otherwise, may be bonded to any vulcanizable neoprene rubber or composition containing same. Typical neoprene rubbers are Neoprene GN, CC and RT and these are conventionally available in the form of vulcanizable compositions. A representative vulcanizable neoprene composition may have the following composition:

| | Parts |
|---|---|
| Neoprene GN or CC | 100 |
| Zinc oxide | 5–20 |
| Magnesium oxide | 2–5 |
| Stearic acid | 1–3 |
| Carbon black (filler) | 20–40 |

The neoprene rubber may be applied to the treated nylon material in conventional fashion. Thus, for example, vulcanizable neoprene composition as referred to above in sheet form, may be pressed against primed nylon fabric prepared according to the invention and vulcanized under conventional conditions (e.g., 280° F. to 300° F. and desirably 150 to 250 p.s.i. pressure for 30 to 60 minutes).

The invention is illustrated, but not limited by the following examples wherein parts and percentages are by weight unless otherwise stated:

EXAMPLE I

This example describes the preparation of a suitable resole/latex composition suitable for use herein as the primer.

RESOLE/LATEX PRIMER

Part A (resin solution)

| | Parts |
|---|---|
| Resorcinol | 5.1 |
| 37% formaldehyde | 6.5 |
| NaOH flakes | .15–.30 |
| Water | 110. |
| (6.25% resin solution), approximately | 122. |

Part B (20% solids)

| | Parts |
|---|---|
| 55% neoprene latex No. 571 | 312.0 |
| 57% zinc oxide paste | 29.8 |
| Ammonia | 10.0 |
| 6.25% resin solution (Part A) | 274.0 |
| Water | 400. |
| | 1025. |

Preparation of Part A

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

Preparation of Part B

The neoprene latex No. 571 was measured into a mixing tank with stirring. The zinc oxide paste was added followed by the water (preferably with the indicated amount of ammonia to give a pH of above 9, typically 9.6) and resin solution (Part A).

The resulting dispersion was ready for immediate use but may be stored for a limited time (about 2 days) at room temperature or for prolonged periods of time under refrigeration.

EXAMPLE II

The resole/neoprene latex primer of Example I was also prepared by repeating Example I except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours of the Part A composition of Example I.

The required amount of the arrested resin solution (12.45 parts) was transferred from the storage drum to the reaction tank. To this arrested resin solution was added 4.3 parts of 37% formaldehyde and 108 parts of water, the water being added first, with agitation. The resulting mixture was aged for from 1–6 hours at 80–84° F.

After the ageing period, the dispersion with neoprene latex was prepared as in Example I.

EXAMPLE III

This example illustrates preparation of a primed nylon fabric and the bonding thereof to neoprene rubber.

A piece of 5 oz./sq. yd. of nylon fabric was run through the 20% solids product of Example II (prepared from "arrested master"), and the pad squeeze rolls. This was done two times so as to get a solids add-on of 12–15%. The fabric was dried at 220° F. after each passage through the squeeze rolls. The thus treated fabric was then subjected to a final cure at 320° F. for 5 minutes to remove all traces of moisture and to fully polymerize and cross-link the resole/latex solids. This curing step may be omitted, if desired, with some decrease in potential adhesion. Temperature and time for this cure can be varied but usually will be within the range of 300 to 340° F. for 3–5 minutes.

A conventional uncured, unvulcanized neoprene sheet (Neoprene GN green stock) about .040 inch thick was then pressed into contact with the thus primed fabric and vulcanized at 280° F. for 60 minutes. In contrast to an adhesion of only 2 pounds using no primer, the fabric processed according to the above example exhibited an adhesion to the neoprene sheet of 44 pounds per inch width, the measurements being made on a peel test when the test jaws were separated at a rate of 2" per minute. Substantially equivalent results were obtained using the product of Example I as the primer.

EXAMPLE IV

The process of Example III was repeated using as the primer one made in the manner of Example I except that the resole solution (Part A) was aged 31 hours before its admixture with the neoprene latex. The resulting adhesion was increased to 61 pounds per inch width on the peel test.

It will be appreciated that various other modifications may be made in the invention described herein. Accordingly, the scope of the invention is defined in the following claims wherein.

I claim:

1. In a process for bonding nylon fibers to neoprene rubber, the improvement which comprises treating said fibers with a primer composition containing base-catalyzed resorcinol-formaldehyde and a neoprene latex prior to bonding of the neoprene rubber to said fibers, said primer composition constituting the sole bonding means and being applied directly to said fibers.

2. In a process for bonding nylon fibers to neoprene rubber, the improvement which comprises treating said fibers with an organic solvent-free, aqueous primer composition including a base-catalyzed resole and a neoprene latex, and drying the thus treated fibers prior to bonding of the neoprene rubber to said fibers, said primer composition constituting the sole bonding means and being applied directly to said fibers.

3. The process of claim 2 including the further step of curing said resole/latex after drying said fibers, said curing step being carried out prior to the bonding of said neoprene rubber.

4. The process of claim 2 including the further step of applying vulcanizable neoprene rubber to the dried fibers and then vulcanizing said rubber.

5. The process of claim 2 wherein the amount of neoprene latex/resole solids applied to said fibers is between 5 and 15%, based on the weight of the dry fibers.

6. The process of claim 5 wherein the ratio of resole solids to neoprene latex solids is between 1:12 and 1:2.5.

7. The product obtained by the process of claim 2.

8. The product obtained by the process of claim 4.

9. A synthetic fibrous material which has a high bonding affinity for neoprene, said material comprising nylon fibers impregnated with a base-catalyzed, partially condensed resorcinol-formaldehyde reaction product and a neoprene latex as the sole bonding means, said fibrous material being characterized by its dry, non-tacky nature whereby said material may be rolled up and stored without losing its bonding affinity for said resin.

10. A bonded product comprising nylon fibers treated with a base-catalyzed resorcinol-formaldehyde condensation product and a neoprene latex as the sole bonding means, said treated fibers being in the dry, non-tacky state prior to bonding, and a vulcanized neoprene sheet bonded to said treated fibers.

References Cited by the Examiner
UNITED STATES PATENTS

| Re. 23,451 | 1/1952 | Mighton | 161—227 |
| 2,748,049 | 5/1956 | Kalafus | 156—335 X |
| 2,902,398 | 9/1959 | Schroeder | 154—139 |

FOREIGN PATENTS 595,290  12/1947  Great Britain.

EARL M. BERGERT, *Primary Examiner.*

CARL F. KRAFFT, *Examiner.*